United States Patent
Allen et al.

(10) Patent No.: US 11,106,687 B2
(45) Date of Patent: *Aug. 31, 2021

(54) SENTIMENT NORMALIZATION USING PERSONALITY CHARACTERISTICS

(71) Applicant: International Business Machines Corporation, Armonk, NY (US)

(72) Inventors: Corville O. Allen, Morrisville, NC (US); Joseph N. Kozhaya, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 65 days.

This patent is subject to a terminal disclaimer.

(21) Appl. No.: 16/293,738

(22) Filed: Mar. 6, 2019

(65) Prior Publication Data

US 2019/0205307 A1    Jul. 4, 2019

Related U.S. Application Data

(63) Continuation of application No. 15/171,323, filed on Jun. 2, 2016, now Pat. No. 10,311,069.

(51) Int. Cl.
*G06F 16/00* (2019.01)
*G06F 16/2457* (2019.01)
(Continued)

(52) U.S. Cl.
CPC .. *G06F 16/24578* (2019.01); *G06F 16/24575* (2019.01); *G06F 16/313* (2019.01);
(Continued)

(58) Field of Classification Search
CPC ......... G06F 16/24575; G06F 16/24578; G06F 16/313; G06F 16/3323; G06F 16/335; G06F 16/337; G06F 16/35; G06F 16/9535
(Continued)

(56) References Cited

U.S. PATENT DOCUMENTS 7,730,017 B2    6/2010   Nance et al.
7,987,188 B2    7/2011   Neylon et al.
(Continued)

FOREIGN PATENT DOCUMENTS

CN         105095183 A    11/2015

OTHER PUBLICATIONS

Bhardwaj, et al., "Users' Sentiment Analysis in Social Media Context using Natural Language Processing", 2014 SDIWC. ISBN:978-0-9891305-6-1 pp. 103-111.
(Continued)

*Primary Examiner* — Michelle N Owyang
(74) *Attorney, Agent, or Firm* — Stosch Sabo (57) ABSTRACT

Sentiment scores for a first set of text can be normalized based on a statistical measure of sentiment of a corpus of text authored by a set of authors having respective personality profiles similar to a personality profile of an author of the first set of text. The set of authors can be grouped in a first cluster based on a range of at least one metric of a personality profile. A plurality of respective sentiment scores for portions of the corpus can be generated for the first cluster. A statistical measure of the plurality of respective sentiment scores can be generated. The plurality of respective sentiment scores can be normalized based on the statistical measure. The plurality of respective normalized sentiment scores can be applied to the first set of text to generate one or more sentiment scores for the first set of text.

20 Claims, 4 Drawing Sheets

(51) Int. Cl.
  *G06F 16/9535* (2019.01)
  *G06F 16/332* (2019.01)
  *G06F 16/335* (2019.01)
  *G06F 16/35* (2019.01)
  *G06F 16/31* (2019.01)

(52) U.S. Cl.
  CPC .......... *G06F 16/335* (2019.01); *G06F 16/337* (2019.01); *G06F 16/3323* (2019.01); *G06F 16/35* (2019.01); *G06F 16/9535* (2019.01)

(58) Field of Classification Search
  USPC .................................................. 707/705–780
  See application file for complete search history.

(56) References Cited

U.S. PATENT DOCUMENTS

| | | | |
|---|---|---|---|
| 9,129,008 | B1 | 9/2015 | Kuznetsov |
| 9,208,444 | B1 | 12/2015 | Zheng et al. |
| 9,336,268 | B1 | 5/2016 | Moudy et al. |
| 10,169,466 | B2 | 1/2019 | Allen et al. |
| 2009/0282019 | A1 | 11/2009 | Galitsky et al. |
| 2012/0036080 | A1 | 2/2012 | Singer et al. |
| 2013/0110928 | A1 | 5/2013 | Ghosh et al. |
| 2014/0019443 | A1* | 1/2014 | Golshan ............ G06F 16/24578 707/723 |
| 2014/0067370 | A1 | 3/2014 | Brun |
| 2014/0236673 | A1 | 8/2014 | Smith et al. |
| 2014/0279906 | A1 | 9/2014 | Peintner |
| 2015/0046371 | A1* | 2/2015 | Leary .................... G06F 40/253 705/347 |
| 2015/0106360 | A1 | 4/2015 | Cao et al. |
| 2016/0098480 | A1* | 4/2016 | Nowson .................. G06F 40/30 707/738 |
| 2016/0132904 | A1 | 5/2016 | Mondal et al. |
| 2016/0328401 | A1 | 11/2016 | Dhawan et al. |
| 2016/0371279 | A1 | 12/2016 | Bai et al. |
| 2017/0142200 | A1 | 5/2017 | Kodner et al. |
| 2017/0161682 | A1 | 6/2017 | Tayarani et al. |
| 2017/0351676 | A1 | 12/2017 | Allen et al. |

OTHER PUBLICATIONS

Khattri, et al., "Your Sentiment Precedes You: Using an author's historical tweets to predict sarcasm", 6 pages.

Ortigosa, et al., "Sentiment analysis in Facebook and its application to e-learning", Computers in Human Behavior 31 (2014). Department of Computer Science, Universidad Autonoma de Madrid, Madrid, Spain. pp. 527-541.

IBM, List of IBM Patents or Patent Applications Treated as Related, Mar. 5, 2019, 2 pages.

* cited by examiner

SENTIMENT NORMALIZATION USING PERSONALITY CHARACTERISTICS

BACKGROUND

The present disclosure relates to natural language processing (NLP), and more specifically, to sentiment analysis and/or emotional analysis based on personality characteristics.

Sentiment analysis is a natural language processing task that defines sentiment polarity (e.g., positive, negative, or neutral) based on natural language text. For example, sentiment analysis can determine the phrase "I enjoyed the game" has a positive sentiment and the phrase "I hated the game" has a negative sentiment.

Emotional analysis is a natural language processing task that defines emotion based on natural language text. Emotional analysis can, for example, differentiate between the positive sentiment associated with happiness and the positive sentiment associated with relief. Likewise, emotional analysis can, for example, differentiate between the negative sentiment associated with anger and the negative sentiment associated with sadness. Thus, emotional analysis can further characterize text beyond identifying a positive, negative, or neutral sentiment of the text.

SUMMARY

Aspects of the present disclosure are directed toward a method for normalizing sentiment scores. The method can comprise characterizing respective personality profiles of a plurality of respective authors, where respective personality profiles are characterized by at least one score of at least one metric. The method can further comprise clustering a set of authors into a first cluster based on the respective personality profiles of the plurality of authors, where the first cluster is associated with a first range of scores of the at least one metric. The method can further comprise compiling a first set of textual data created by authors of the set of authors in the first cluster. The method can further comprise computing a plurality of respective sentiment scores of a plurality of respective portions of text from the first set of textual data. The method can further comprise normalizing the plurality of respective sentiment scores based on a statistical measure of the plurality of the sentiment scores of the first set of textual data. The method can further comprise storing the normalized sentiment scores of the first cluster and the first range of scores of the at least one metric associated with the first cluster in a computer readable storage medium.

Further aspects of the present disclosure are directed toward a system for characterizing sentiment comprising a user interface configured to receive input from a user and display output to the user, a memory storing a plurality of sets of normalized sentiment analysis data and a plurality of personality profile categories, where each respective set of normalized sentiment analysis data is associated with a respective personality profile category, and a processor. The processor can be configured to receive a set of text from the user interface and match a personality profile of an author of the set of text to a personality profile category. The processor can be further configured to retrieve a set of normalized sentiment analysis data corresponding to the personality profile category from the memory and compute sentiment of the set of text using the set of normalized sentiment analysis data. The processor can be further configured to output the computed sentiment of the set of text to the user interface.

Further aspects of the present disclosure are directed toward a computer program product for normalizing sentiment scores. The computer program product can comprise a computer readable storage medium having program instructions embodied on the computer readable storage medium, where the computer readable storage medium is not a transitory signal per se. The program instructions can be executable by a processor to cause the processor to perform a method comprising clustering a plurality of authors into a plurality of clusters based on respective personality profiles of respective authors, where respective personality profiles are measured according to at least one score of at least one metric, where a first cluster comprises a first set of authors of the plurality of authors having respective scores within a first range, and where a first set of text is compiled for the first cluster comprising a plurality of respective portions of text written by respective authors of the first set of authors. The program instructions can be further configured to cause the processor to perform a method further comprising computing respective sentiment scores for respective portions of text and normalizing respective sentiment scores based on a statistical measure of the first set of text. The program instructions can be further configured to cause the processor to perform a method further comprising storing the normalized sentiment scores of the first cluster and the first range in the computer readable storage medium.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure relate to natural language processing (NLP). More particular aspects relate to sentiment analysis and/or emotional analysis using personality profiles. Although not limited to such applications, an understanding of some embodiments of the present disclosure may be improved given the context of NLP and sentiment analysis and/or emotional analysis. It is to be understood that embodiments of the present disclosure described with respect to sentiment analysis are also configurable to be used with emotional analysis rather than, or in addition to, sentiment analysis.

Aspects of the present disclosure relate to normalizing sentiment polarity of a text according to a personality profile of an author of the text. For example, the phrase "the game was not bad" can be classified as a positive sentiment according to one personality profile and classified as a less positive sentiment according to a second personality profile. Further aspects of the present disclosure can conduct emotional analysis. Thus, the phrase "the game was not bad" can be classified as a positive sentiment based on the emotion of relief according to a first personality profile. In contrast, the phrase "the game was not bad" can be classified as a negative sentiment based on the emotion of disappointment according to a second personality profile. As is understood by one of skill in the art, numerous methods, techniques, and algorithms exist that are configured to compute sentiment and/or emotion based on, for example, evaluating words and/or phrases surrounding a subject word or phrase.

In some embodiments, sentiment classifiers can be trained based on text for clusters of individuals with similar personality profiles. The characterization of personality profiles from text is a known NLP technique, such as, for example, IBM Personality Insights. Personality profiles can be characterized according to one or more metrics such as, but not limited to, agreeableness, extraversion/introversion, conscientiousness, openness, and neuroticism. In some embodiments, personality profiles can be further characterized by values as measured by one or more metrics such as, but not limited to, helpfulness, stimulation, tradition, pleasure, and achievement. In some embodiments, personality profiles can be further characterized by needs as measured by one or more metrics such as, but not limited to, harmony, love, practicality, liberty, and closeness. In some embodiments, metrics can be measured and respective scores for respective metrics can be generated based on text authored by an individual for whom a personality profile is being characterized. In alternative embodiments, the metrics can be measured and respective scores for respective metrics can be generated based on survey responses or test results. In accordance with some embodiments of the present disclosure, respective scores can be converted to respective percentiles based on respective distributions of respective populations of scores for respective metrics.

Advantageously, aspects of the present disclosure normalize sentiment scores by accounting for a personality profile of an individual. Normalized sentiment scores can thus generate comparable sentiment analyses for texts written by authors having significantly different personalities. Furthermore, aspects of the present disclosure normalize sentiment scores according to a cluster of personality profiles. Thus, aspects of the present disclosure can be applied to numerous texts written by numerous authors. It is to be understood that the aforementioned advantages are example advantages and some embodiments of the present disclosure can contain all, none, or some of the advantages described herein.

Figure 1:
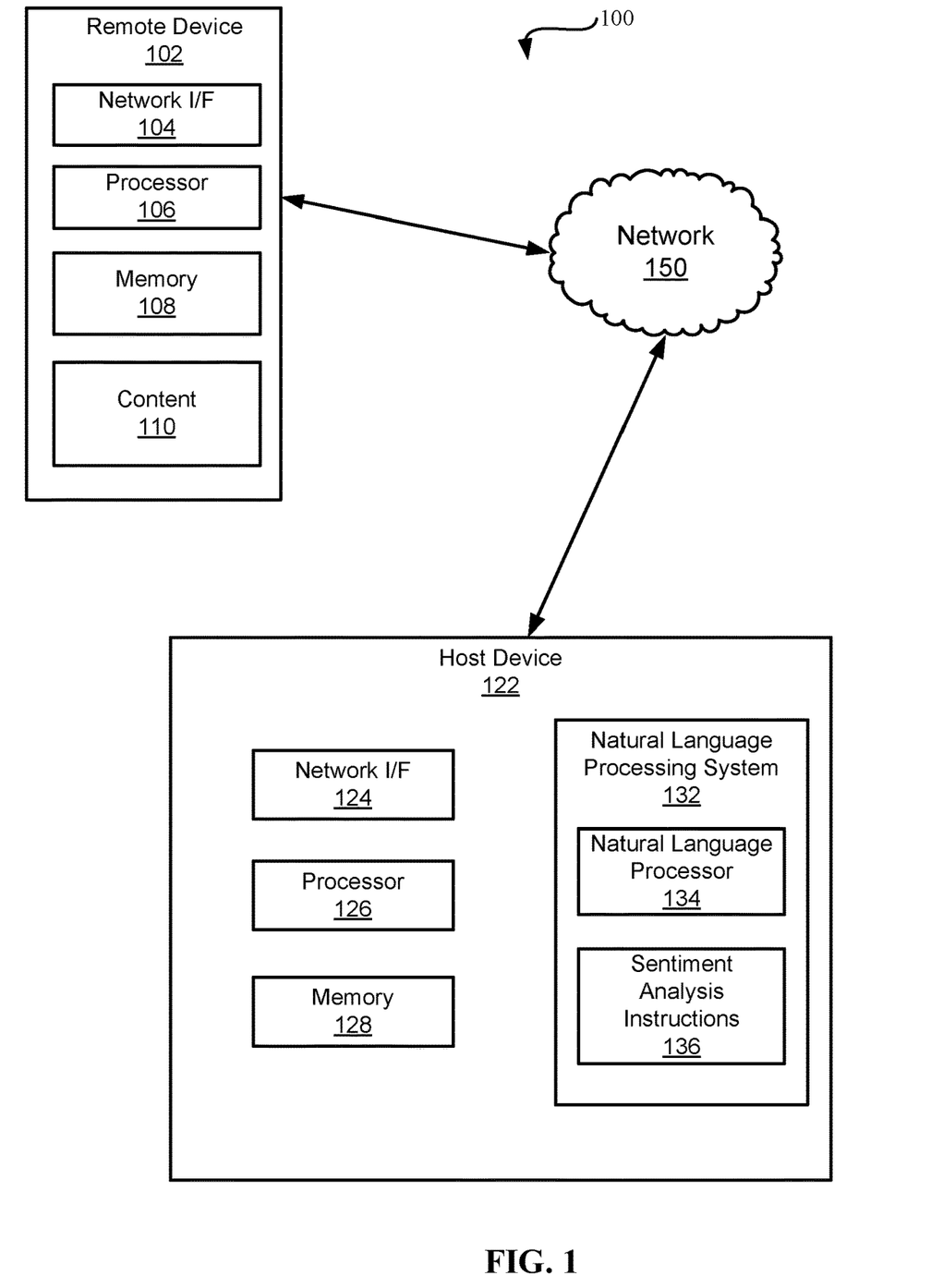
FIG. 1 depicts a block diagram of an example computing environment in which embodiments of the present disclosure may be implemented.

Referring now to the figures, FIG. 1 depicts a block diagram of an example computing environment 100 in which embodiments of the present disclosure can be implemented. In embodiments, the computing environment 100 can include a remote device 102 and a host device 122.

According to embodiments, the host device 122 and the remote device 102 can be computer systems. The remote device 102 and the host device 122 can include one or more processors 106 and 126 and one or more memories 108 and 128, respectively. The remote device 102 and the host device 122 can be configured to communicate with each other through an internal or external network interface 104 and 124 (e.g., modems or interface cards). The remote device 102 and/or the host device 122 can be equipped with a display or monitor. Additionally, the remote device 102 and/or the host device 122 can include optional input devices (e.g., a keyboard, mouse, scanner, or other input device), and/or any commercially available or custom software (e.g., browser software, communications software, server software, natural language processing software, search engine, and/or web crawling software, filter modules for filtering content based upon predefined parameters, etc.). In some embodiments, the remote device 102 and/or the host device 122 can be servers, desktops, laptops, or hand-held devices.

The remote device 102 and the host device 122 can be distant from each other and can communicate over a network 150. In embodiments, the host device 122 can be a central hub from which a remote device 102 and other remote devices (not pictured) can establish a communication connection, such as in a client-server networking model. In some embodiments, the host device 122 and remote device 102 can be configured in any other suitable network relationship (e.g., in a peer-to-peer configuration or using another network topology).

In embodiments, the network 150 can be implemented using any number of any suitable communications media. For example, the network 150 can be a wide area network (WAN), a local area network (LAN), the Internet, or an intranet. In certain embodiments, the remote device 102 and the host device 122 can be local to each other, and communicate via any appropriate local communication medium. For example, the remote device 102 and the host device 122 can communicate using a local area network (LAN), one or more hardwire connections, a wireless link or router, or an intranet. In some embodiments, the remote device 102, the host device 122, and any other devices can be communicatively coupled using a combination of one or more networks and/or one or more local connections. For example, the remote device 102 can be hardwired to the host device 122 (e.g., connected with an Ethernet cable) while a second device (not pictured) can communicate with the host device using the network 150 (e.g., over the Internet).

In some embodiments, the network 150 can be implemented within a cloud computing environment, or using one or more cloud computing services. Consistent with various embodiments, a cloud computing environment can include a network-based, distributed data processing system that provides one or more cloud computing services. Further, a cloud computing environment can include many computers (e.g., hundreds or thousands of computers or more) disposed within one or more data centers and configured to share resources over the network 150.

In some embodiments, the remote device 102 can enable users to submit (or can submit automatically with or without a user selection) content 110 to the host device 122. Content 110 can include, for example, documents or other files containing text therein that are suitable for sentiment analysis. In some embodiments, the host device 122 can include a natural language processing system 132. The natural language processing system 132 can include a natural language processor 134, and sentiment analysis instructions 136. The natural language processor 134 can include numerous subcomponents, such as a tokenizer, a part-of-speech (POS) tagger, a semantic relationship identifier, and a syntactic relationship identifier. An example natural language processor is discussed in more detail hereinafter with respect to FIG. 2. The natural language processor 134 can be configured to perform natural language processing to ingest content 110 from remote device 102. In various embodiments, content 110 can comprise a single document or a set of documents suitable for sentiment analysis.

In some embodiments, sentiment analysis instructions 136 are configured to receive content 110 stored in remote device 102. Sentiment analysis instructions 136 can identify respective personality profiles of respective authors associated with the received content 110. Sentiment analysis instructions 136 can group authors based on personality profiles and group documents corresponding to the groups of authors. Sentiment analysis instructions 136 can compute respective sentiment scores for respective words and/or phrases in each group (e.g., the word "good" can have a number of sentiment scores corresponding to a sentiment score based on text associated with each cluster of authors having similar personality profiles). Sentiment analysis instructions 136 can compute a statistical measure (e.g., average) for all sentiment scores in each cluster. Sentiment analysis instructions 136 can normalize sentiment scores for one or more words and/or phrases in each cluster. The aforementioned embodiments are described in greater detail hereinafter with respect to FIG. 3.

Sentiment analysis instructions 136 can store sentiment data, such as, but not limited to, personality profile data, sentiment scores of respective words associated with respective personality profiles, average sentiment scores of all words associated with respective personality profiles, and/or other data relevant to sentiment analysis using personality profiles in, for example, memory 128, memory 108, a cloud, or a different memory communicatively coupled to the host device 122. Sentiment analysis instructions 136 can further send sentiment data to remote device 102. Sentiment analysis instructions 136 can further display sentiment data on a user interface communicatively coupled to the host device 122.

In additional embodiments, sentiment analysis instructions 136 can be configured to receive a request for sentiment analysis of a set of text (e.g., received from remote device 102). Sentiment analysis instructions 136 can be configured to identify a personality profile of an author of the received set of text. Sentiment analysis instructions 136 can be further configured to retrieve sentiment data from, for example, memory 128 that is associated with the identified personality profile (e.g., normalized sentiment scores for a cluster of personality profiles matching the identified personality profile). Sentiment analysis instructions 136 can be further configured to use the retrieved normalized sentiment data to characterize sentiment of the set of text. Sentiment analysis instructions 136 can store the characterized sentiment in, for example, memory 128, memory 108, or a different memory communicatively coupled to the host device 122. Sentiment analysis instructions 136 can further display characterized sentiment on a user interface communicatively coupled to host device 122.

While FIG. 1 illustrates a computing environment 100 with a single host device 122 and a single remote device 102, suitable computing environments for implementing embodiments of this disclosure can include any number of remote devices and host devices. The various models, modules, systems, instructions, and components illustrated in FIG. 1 can exist, if at all, across a plurality of host devices and remote devices.

It is noted that FIG. 1 is intended to depict representative components of an example computing environment 100. In some embodiments, however, individual components can have greater or lesser complexity than as represented in FIG. 1, components other than or in addition to those shown in FIG. 1 can be present, and the number, type, and configuration of such components can vary.

Figure 2:
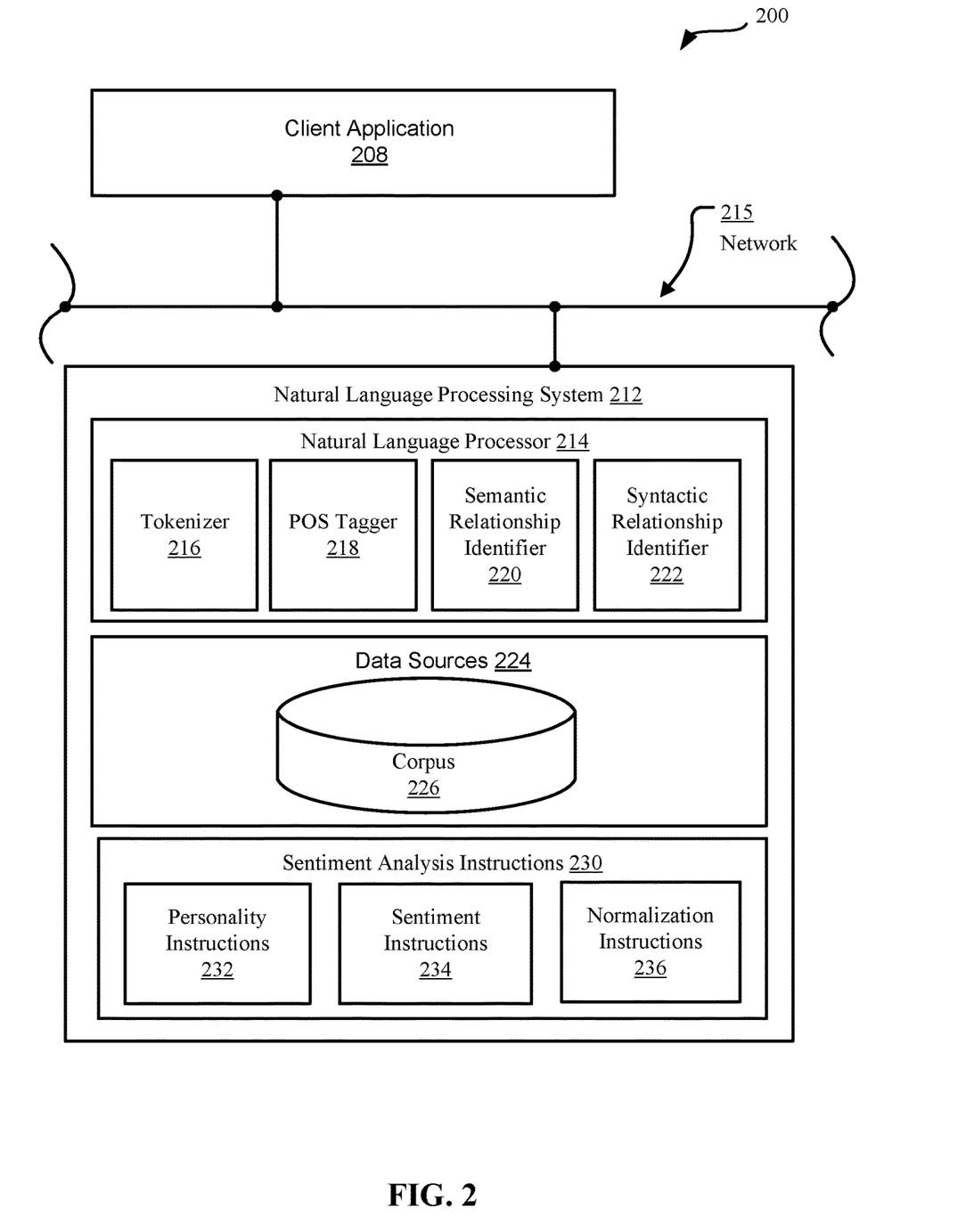
FIG. 2 depicts a block diagram of an example system architecture, including a natural language processing system, configured to perform sentiment analysis according to some embodiments of the present disclosure.

FIG. 2 depicts a block diagram of an example system architecture 200, including natural language processing system 212, configured to characterize sentiment contained in ingested content. In some embodiments, a remote device (such as remote device 102 of FIG. 1) can submit content (e.g., documents) to be analyzed by the natural language processing system 212 which can be housed on a host device (such as host device 122 of FIG. 1). A remote device (e.g., remote device 102 of FIG. 1) can include a client application 208, which can itself involve one or more entities operable to characterize sentiment that can be dispatched to a natural language processing system 212 via a network 215.

In some embodiments, the natural language processing system 212 can respond to content submissions sent by a client application 208. Specifically, the natural language processing system 212 can analyze content or other data to characterize sentiment based on personality profile information of a group which exhibits a similar personality profile to an author of the content or other data.

In some embodiments, the natural language processing system 212 can include a natural language processor 214, data sources 224, and sentiment analysis instructions 230. The natural language processor 214 can be configured to analyze the received content by performing various methods and techniques according to various sets of processor-executable instructions. These sets of processor-executable instructions can include, but are not limited to, a tokenizer 216, a part-of-speech (POS) tagger 218, a semantic relationship identifier 220, and a syntactic relationship identifier 222. Further, the natural language processor 214 can be configured to recognize and analyze any number of natural languages. In some embodiments, the natural language processor 214 can parse passages of the received content.

In some embodiments, the tokenizer 216 can be a computer module (or a set of instructions executable by the natural language processor 214) that performs lexical analysis. The tokenizer 216 can convert a sequence of characters into a sequence of tokens. A token can be a string of characters included in a written passage and categorized as a meaningful symbol. Further, in some embodiments, the tokenizer 216 can identify word boundaries in content and break text passages within the content into their component text elements, such as words, multiword tokens, numbers, and punctuation marks. In some embodiments, the tokenizer 216 can receive a string of characters, identify the lexemes in the string, and categorize them into tokens.

Consistent with various embodiments, the POS tagger 218 can be a computer module (or a set of instructions executable by the natural language processor 214) that marks up a word in passages to correspond to a particular part of speech. The POS tagger 218 can read a passage or other text in natural language and assign a part of speech to each word or each token. The POS tagger 218 can determine the part of speech to which a word (or other text element) corresponds based on the definition of the word and the context of the word. The context of a word can be based on its relationship with adjacent and related words in a phrase, sentence, or paragraph. Examples of parts of speech that can be assigned to words include, but are not limited to, nouns, verbs, adjectives, adverbs, and the like. Examples of other part of speech categories that POS tagger 218 can assign include, but are not limited to, comparative or superlative adverbs, wh-adverbs, conjunctions, determiners, negative particles, possessive markers, prepositions, wh-pronouns, and the like. In some embodiments, the POS tagger 218 can tag or otherwise annotate tokens of a passage with part of speech categories. In some embodiments, the POS tagger 218 can tag tokens or words of a passage to be parsed by the natural language processing system 212.

In some embodiments, the semantic relationship identifier 220 can be a computer module (or a set of instructions executable by the natural language processor 214) that can be configured to identify semantic relationships of recognized text elements (e.g., words, phrases) in received content. In some embodiments, the semantic relationship identifier 220 can determine functional dependencies between entities and other semantic relationships.

In some embodiments, the syntactic relationship identifier 222 can be a computer module (or a set of instructions executable by the natural language processor 214) that can be configured to identify syntactic relationships in a passage composed of tokens. The syntactic relationship identifier 222 can determine the grammatical structure of sentences such as, for example, which groups of words are associated as phrases and which word is the subject or object of a verb. The syntactic relationship identifier 222 can conform to formal grammar.

In some embodiments, the natural language processor 214 can be a computer module that can parse received content and generate corresponding data structures for one or more portions of the received content. For example, in response to receiving a repository of documents at the natural language processing system 212, the natural language processor 214 can output parsed text elements from the documents as data structures. In some embodiments, a parsed text element can be represented in the form of a parse tree or other graph structure. To generate the parsed text element, the natural language processor 214 can execute the instructions contained in 216-222.

In some embodiments, the output of natural language processor 214 (e.g., ingested content) can be stored within data sources 224, such as corpus 226. As used herein, a corpus can refer to one or more discrete data sets (e.g., a relational database, a set of documents, a website, or a plurality of data sets such as, for example, a plurality of databases, websites, and/or documents). In some embodiments, the data sources 224 can include data warehouses, corpora, data models, and document repositories.

In some embodiments, the sentiment analysis instructions 230 can characterize sentiment of data sources 224 including the corpus 226. Likewise, the sentiment analysis instructions 230 can characterize sentiment from other data sources received from a client application 208. In some embodiments, the sentiment analysis instructions 230 can generate normalized sentiment scores for various words and/or phrases based on a personality profile of an author of the various words and/or phrases.

In some embodiments, the sentiment analysis instructions 230 can include personality instructions 232, sentiment instructions 234, and normalization instructions 236. Personality instructions 232 can comprise processor-executable instructions for determining a personality profile of respective authors of respective texts. In some embodiments, personality instructions 232 are consistent with the techniques, instructions, and methods employed by IBM product Personality Insights. Personality instructions 232 can be further configured to group a plurality of authors into a plurality of clusters where each cluster comprises respective ranges of one or more scores or percentiles corresponding to each of the one or more metrics used to characterize a personality profile.

Sentiment instructions 234 can comprise processor-executable instructions for determining sentiment in a given document. Sentiment instructions 234 can be configured to determine a respective sentiment score for respective words and/or phrases in a set of documents associated with a cluster of authors. Thus, in a case where there are K clusters (where K is a variable, non-negative integer), respective words and/or phrases can have K sentiment scores corresponding to one sentiment score for each cluster of authors having similar personality profiles. Sentiment instructions 234 can be further configured to determine an average sentiment, a median sentiment, and/or a range of sentiment of all words and/or phrases for each cluster of authors having similar personality profiles.

Normalization instructions 236 can normalize respective sentiment scores of respective words corresponding to respective groups of authors having similar personality profiles. Normalization instructions 236 can use various statistical measures such as, but not limited to, mean, median, or range measures to normalize respective sentiment scores of respective words and/or phrases relative to all sentiment scores for all words and/or phrases of a respective cluster. Normalization instructions 236 can be configured to divide respective sentiment scores of a respective word or phrase in a respective cluster by the statistical measure of all words and phrases in the respective cluster to generate a normalized sentiment score for the respective word or phrase.

Figure 3:
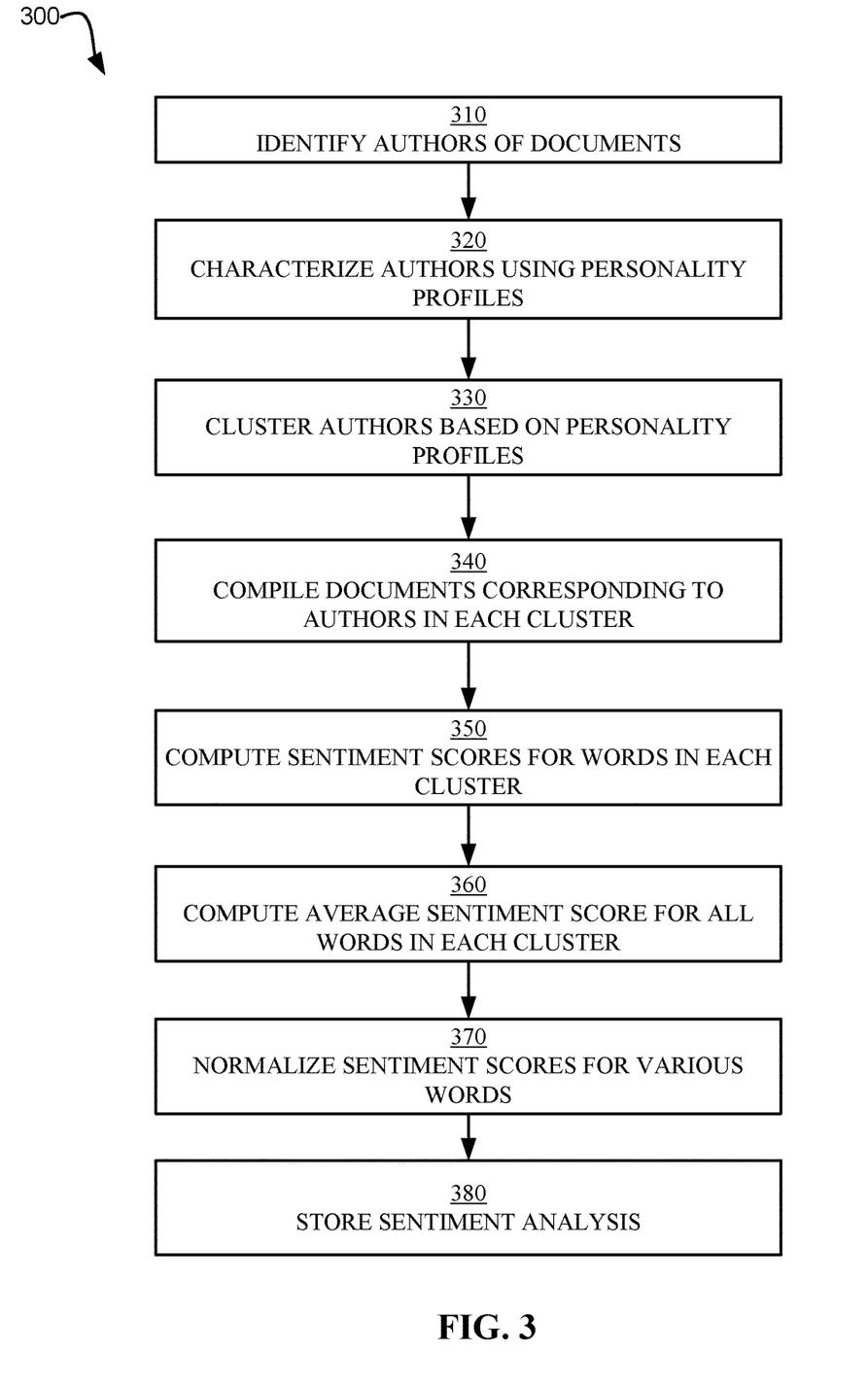
FIG. 3 illustrates a flowchart of an example method for normalizing sentiment scores based on personality profiles.

FIG. 3 illustrates a flowchart of an example method 300 for normalizing sentiment scores based on personality profiles. In some embodiments, the method 300 can be executed by a processor (e.g., natural language processor 134 of FIG. 1 or natural language processor 214 of FIG. 2) according to a set of instructions (e.g., sentiment analysis instructions 136 of FIG. 1 or sentiment analysis instructions 230 of FIG. 2).

The method 300 can start by identifying a plurality of authors of a plurality of documents in operation 310 (e.g., documents stored in corpus 226 of FIG. 2). Authors can be identified by, for example, retrieving metadata from respective documents. In some embodiments, more than one author can be identified for a respective document. Respective authors can be represented by, for example, the variable $A_i$ where i=1 to N such that N is a variable number of authors corresponding to the plurality of authors of the plurality of documents.

In operation 320, each author can be characterized by determining a personality profile of each author based on text written by each author. Personality profiles can be generated by, for example IBM Personality Insights or other techniques configured to characterize personality according to one or more metrics that can be scored based on, for example, textual data, survey responses, and/or test results. Example metrics can include, but are not limited to, agreeableness, extraversion/introversion, conscientiousness, openness, neuroticism, helpfulness, stimulation, tradition, pleasure, achievement, harmony, love, practicality, liberty, and closeness. The metrics can be quantified by a numeric score or a percentile. A percentile can be generated by comparing a numeric score to a distribution of scores. Respective personality profiles can be represented by, for example, $PP_i$ where i=1 to N such that a respective personality profile $PP_i$ is generated for each author $A_i$ identified in operation 310.

In operation 330, the plurality of authors can be clustered according to similar personality profiles. Thus, for the plurality of N authors, there can be a variable number K clusters of authors where K is less than or equal to N. The variable K clusters can be represented by, for example, $C_x$ where $x=1$ to K. Respective clusters $C_x$ can comprise one or more respective authors $A_i$ based on respective personality profiles of the respective authors and further such that each author $A_i$ is assigned to a cluster $C_x$. Any number of clustering methods can be used. For example, clusters can be defined according to a unique set of ranges corresponding to a set of metrics used in characterizing a personality profile in operation 320. For example, a cluster could be defined by personality profiles having an agreeableness percentile between 75%-100%, an extraversion percentile between 75%-100%, a conscientiousness percentile between 50%-75%, an openness percentile between 25%-50%, and a neuroticism percentile between 0%-25%. The percentile ranges in the aforementioned example are example ranges and similar or different ranges of similar or different metrics characterized by scores or percentiles are within the spirit and scope of the present disclosure.

In operation 340, the plurality of documents can be compiled into respective groups corresponding to respective clusters such that each cluster is associated with a group of documents written by the authors of a given cluster. For example, an author $A_i$ can author one or more documents, indicated by a variable $DS_i$. Thus, the compiled documents corresponding to a respective cluster of authors, $C_x$, can be a union of each $DS_i$ of each author $A_i$ in the respective cluster $C_x$. For example, the set of documents compiled in operation 340 can correspond to an expression such as, but not limited to, $DOC_x=UNION(DS_i)$ for all $A_i$ in $C_x$.

In operation 350, respective sentiment scores for respective words and/or phrases in respective clusters can be computed. For example, a hypothetical word or phrase can be defined by the variable "$w_p$" where $p=1$ to M, where M comprises the total number of words and/or phrases in $DOC_x$ where $x=1$ to K, and where the M words and phrases are stored in a list, such as, for example, WLIST. A sentiment score can be represented by a function named "senscore." Thus, for a given word or phrase, $w_p$, there can be $senscore_x(w_p)$ where x represents a given cluster $C_x$. Thus, there can be K sentiment scores generated for each word or phrase $w_p$ in WLIST corresponding to one sentiment score for each cluster in which the word or phrase is found. Sentiment scores can be generated by numerous methods and techniques understood by one of skill in the art. Sentiment scores can be calculated based on a word or phrase for which the sentiment score is being calculated and/or based on one or more words or phrases modifying the word or phrase for which the sentiment score is being calculated.

In operation 360, an average sentiment score can be computed for all words considered in operation 350 for each respective cluster. An average sentiment score can be represented by a function such as, but not limited to, $$avgsenscore_x = \left(\frac{1}{M}\right) sum\ (senscore_x(w_p))$$

for all $w_p$ in WLIST for a given cluster $C_x$. In some embodiments, statistical measures other than the average can be used. For example, a median of the sentiment scores can be used, a range of the sentiment scores can be used, or a different statistical measure can be used.

In operation 370, respective sentiment scores of respective words and/or phrases can be normalized relative to all the sentiment scores for a respective cluster. In some embodiments, the normalized sentiment scores can be represented by a function such as $normsenscore_x=senscore_x(w_p)/avgsenscore_x$ for a given word or phrase $w_p$ in a given cluster $C_x$.

In operation 380, the sentiment analysis generated by the method 300 in operations 310-370 can be stored. Operation 380 can comprise temporarily or permanently storing, for example, respective personality profiles of respective authors, respective clusters of similar personality profiles, respective sentiment scores for respective words and/or phrases of respective clusters, average sentiment scores of respective clusters, and/or normalized sentiment scores of respective words and/or phrases. The sentiment analysis can be stored in a computer readable storage medium that is physically or virtually connected to the processor executing the method 300. In some embodiments, operation 380 can further comprise outputting the sentiment analysis to a user interface.

Figure 4:
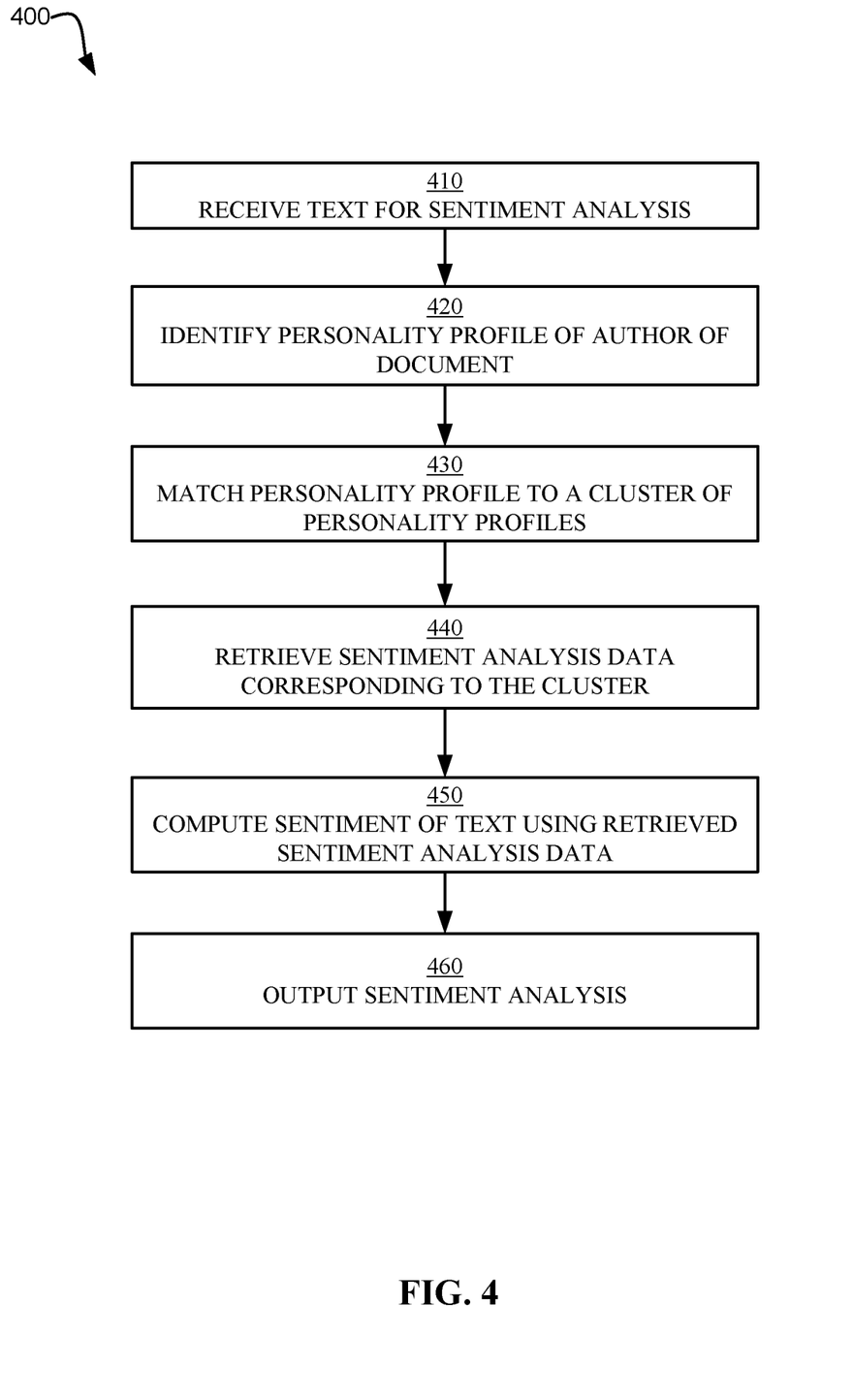
FIG. 4 illustrates a flowchart of an example method for characterizing sentiment of a received document using personality profile information.

FIG. 4 illustrates an example method 400 for characterizing sentiment of received text using personality profile information. In some embodiments, the method 400 can be executed by a processor (e.g., natural language processor 134 of FIG. 1 or natural language processor 214 of FIG. 2) based on a set of instructions (e.g., sentiment analysis instructions 136 of FIG. 1 or sentiment analysis instructions 230 of FIG. 2).

The method 400 can start at operation 410 by receiving a set of text for sentiment analysis. The text can be received from, for example, a remote device (e.g., remote device 102 of FIG. 1) via a physical interconnect or a virtual network (e.g., network 150 of FIG. 1) or from a client application (e.g., client application 208 of FIG. 2) via a physical interconnect or a virtual network (e.g., network 215 of FIG. 2).

In operation 420, a personality profile of an author of the received text can be identified. In some embodiments, the personality profile is identified using IBM Personality Insights. In alternative embodiments, the personality profile is identified according to other techniques suitable for characterizing aspects of personality based on, for example, textual analysis, survey responses, and/or test results. In some embodiments, the personality profile can be identified by one or more metrics such as, but not limited to, agreeableness, extraversion/introversion, conscientiousness, openness, neuroticism, helpfulness, stimulation, tradition, pleasure, achievement, harmony, love, practicality, liberty, and closeness. In some embodiments, operation 420 can output a set of scores or a set of percentiles corresponding to a set of metrics characterizing the personality profile. Respective scores can be determined by, for example, evaluating text written by a respective author. Respective percentiles can be determined by comparing a respective score for a respective metric to a distribution of scores of the respective metric.

In operation 430, the identified personality profile can be matched to a cluster of personality profiles. In some embodiments, the cluster of personality profiles corresponds to a cluster $C_x$ from the set of K clusters defined in operation 330 of FIG. 3. Operation 430 can comprise identifying a cluster characterized by a range of one or more metrics that encompasses the one or more metrics characterizing the personality profile of the author as identified in operation 420.

In operation 440, sentiment analysis data associated with the matched cluster of personality profiles can be retrieved from a memory (e.g., memory 128 of FIG. 1). Sentiment analysis data can include, but is not limited to, one or more of: respective sentiment scores for respective words and/or phrases of the matched cluster of personality profiles, an average sentiment score for the matched cluster of personality profiles, and/or respective normalized sentiment scores for respective words and/or phrases of the matched cluster of personality profiles. In some embodiments, operation 440 retrieves data stored in operation 380 of the method 300.

In operation 450, a sentiment score of the received set of text can be computed using the sentiment analysis data retrieved in operation 440. In various embodiments, the sentiment score can comprise a single score and/or a plurality of scores. A single score can represent sentiment of the set of text in its entirety. The single score can comprise a score based on a plurality of normalized sentiment scores from the retrieved sentiment analysis data applied to the received set of text. A plurality of scores can represent various sentiments of various aspects of the set of text (e.g., a word, phrase, paragraph, topic, etc.). The plurality of scores can be generated by applying normalized sentiment scores from the retrieved sentiment analysis data to the various aspects of the set of text.

In operation 460, the sentiment analysis can be permanently or temporarily stored in a computer readable storage medium. Operation 460 can further comprise outputting the sentiment analysis to a user interface, a client application (e.g., client application 208 of FIG. 2) and/or a remote device (e.g., remote device 102 of FIG. 1).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments of the present invention may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing, invoicing, or otherwise receiving payment for use of the systems.

What is claimed is:

1. A method comprising:
   characterizing personality profiles of a plurality of authors, wherein characterizing the personality profiles further comprises:
     computing scores of a plurality of metrics comprising agreeableness, extraversion, conscientiousness, openness, neuroticism, helpfulness, stimulation, tradition, pleasure, achievement, harmony, love, practicality, liberty, and closeness for each of the plurality of authors; and
     determining a percentile of each score of each metric for each of the plurality of authors relative to a population having a respective distribution of scores for each of the plurality of metrics;
   clustering a set of authors into a first cluster based on the personality profiles of the plurality of authors, wherein the first cluster is defined by a respective range of scores for each of the plurality of metrics;
   compiling, in response to the clustering, a first set of textual data created by authors of the set of authors in the first cluster;
   computing a plurality of sentiment scores of a plurality of portions of text from the first set of textual data;
   normalizing the plurality of sentiment scores, wherein normalizing the plurality of sentiment scores further comprises:
     computing a sum of sentiment scores for the first cluster by adding the plurality of sentiment scores generated for the first cluster;
     computing an average sentiment score by dividing the sum of sentiment scores for the first cluster by a total number of sentiment scores generated for the first cluster; and
     computing a plurality of normalized sentiment scores by dividing each of the plurality of sentiment scores for the first cluster by the average sentiment score of the first cluster; and
   storing the plurality of normalized sentiment scores for the first cluster and the respective range of scores for each of the plurality of metrics defined by the first cluster in a computer readable storage medium.

2. The method of claim 1, further comprising:
   receiving a request to perform sentiment analysis on a new set of text;
   characterizing a personality profile of an author of the new set of text based on scores of the plurality of metrics;
   determining the scores of the plurality of metrics are within the respective range of scores defined by the first cluster;
   retrieving, from the computer readable storage medium, the plurality of normalized sentiment scores for the first cluster; and
   computing a sentiment for a portion of the new set of text according to the plurality of normalized sentiment scores.

3. The method of claim 2, wherein computing the sentiment of the portion of the new set of text further comprises:
   matching portions of the new set of text with portions of the first set of textual data;
   applying a subset of the plurality of normalized sentiment scores to matched portions of the new set of text; and
   combining the subset of the plurality of normalized sentiment scores for the matched portions of the new set of text.

4. The method of claim 1, wherein clustering the set of authors into the first cluster further comprises:
   determining, for a first author, that the scores for each of the plurality of metrics of a personality profile of the first author is within the respective range of scores for each of the plurality of metrics defined by the first cluster; and
   assigning the first author to the first cluster.

5. The method of claim 1, wherein computing the plurality of sentiment scores further comprises:
   selecting a first portion of text from the plurality of portions of text;
   identifying a first set of modifiers for a first word of the first portion of text; and
   applying a sentiment score to the first word based on the first set of modifiers.

6. The method of claim 1, the method further comprising:
clustering the plurality of authors into a plurality of clusters, wherein each of the plurality of clusters is associated with respective percentile ranges corresponding to each of agreeableness, extraversion, conscientiousness, openness, neuroticism, helpfulness, stimulation, tradition, pleasure, achievement, harmony, love, practicality, liberty, and closeness.

7. The method of claim 6, wherein each author in the set of authors is associated with a percentile in each of agreeableness, extraversion, conscientiousness, openness, neuroticism, helpfulness, stimulation, tradition, pleasure, achievement, harmony, love, practicality, liberty, and closeness that falls within a range of percentiles of each of agreeableness, extraversion, conscientiousness, openness, neuroticism, helpfulness, stimulation, tradition, pleasure, achievement, harmony, love, practicality, liberty, and closeness defined by the first cluster.

8. A system comprising:
a computer readable storage medium storing program instructions; and
a processor configured to execute the program instructions to perform a method comprising:
characterizing personality profiles of a plurality of authors, wherein characterizing the personality profiles further comprises:
computing scores of a plurality of metrics comprising agreeableness, extraversion, conscientiousness, openness, neuroticism, helpfulness, stimulation, tradition, pleasure, achievement, harmony, love, practicality, liberty, and closeness for each of the plurality of authors; and
determining a percentile of each score of each metric for each of the plurality of authors relative to a population having a respective distribution of scores for each of the plurality of metrics;
clustering a set of authors into a first cluster based on the personality profiles of the plurality of authors, wherein the first cluster is defined by a respective range of scores for each of the plurality of metrics;
compiling, in response to the clustering, a first set of textual data created by authors of the set of authors in the first cluster;
computing a plurality of sentiment scores of a plurality of portions of text from the first set of textual data;
normalizing the plurality of sentiment scores, wherein normalizing the plurality of sentiment scores further comprises:
computing a sum of sentiment scores for the first cluster by adding the plurality of sentiment scores generated for the first cluster;
computing an average sentiment score by dividing the sum of sentiment scores for the first cluster by a total number of sentiment scores generated for the first cluster; and
computing a plurality of normalized sentiment scores by dividing each of the plurality of sentiment scores for the first cluster by the average sentiment score of the first cluster; and
storing the plurality of normalized sentiment scores for the first cluster and the respective range of scores for each of the plurality of metrics defined by the first cluster in the computer readable storage medium.

9. The system of claim 8, the method further comprising:
receiving a request to perform sentiment analysis on a new set of text;
characterizing a personality profile of an author of the new set of text based on scores of the plurality of metrics;
determining the scores of the plurality of metrics are within the respective range of scores defined by the first cluster;
retrieving, from the computer readable storage medium, the plurality of normalized sentiment scores for the first cluster; and
computing a sentiment for a portion of the new set of text according to the plurality of normalized sentiment scores.

10. The system of claim 9, wherein computing the sentiment of the portion of the new set of text further comprises:
matching portions of the new set of text with portions of the first set of textual data;
applying a subset of the plurality of normalized sentiment scores to matched portions of the new set of text; and
combining the subset of the plurality of normalized sentiment scores for the matched portions of the new set of text.

11. The system of claim 8, wherein clustering the set of authors into the first cluster further comprises:
determining, for a first author, that the scores for each of the plurality of metrics of a personality profile of the first author is within the respective range of scores for each of the plurality of metrics defined by the first cluster; and
assigning the first author to the first cluster.

12. The system of claim 8, wherein computing the plurality of sentiment scores further comprises:
selecting a first portion of text from the plurality of portions of text;
identifying a first set of modifiers for a first word of the first portion of text; and
applying a sentiment score to the first word based on the first set of modifiers.

13. The system of claim 8, the method further comprising:
clustering the plurality of authors into a plurality of clusters, wherein each of the plurality of clusters is associated with respective percentile ranges corresponding to each of agreeableness, extraversion, conscientiousness, openness, neuroticism, helpfulness, stimulation, tradition, pleasure, achievement, harmony, love, practicality, liberty, and closeness.

14. The system of claim 13, wherein each author in the set of authors is associated with a percentile in each of agreeableness, extraversion, conscientiousness, openness, neuroticism, helpfulness, stimulation, tradition, pleasure, achievement, harmony, love, practicality, liberty, and closeness that falls within a range of percentiles of each of agreeableness, extraversion, conscientiousness, openness, neuroticism, helpfulness, stimulation, tradition, pleasure, achievement, harmony, love, practicality, liberty, and closeness defined by the first cluster.

15. A computer program product comprising a computer readable storage medium having program instructions embodied therewith, wherein the computer readable storage medium is not a transitory signal per se, the program instructions executable by a processor to cause the processor to perform a method comprising:
characterizing personality profiles of a plurality of authors, wherein characterizing the personality profiles further comprises:
computing scores of a plurality of metrics comprising agreeableness, extraversion, conscientiousness, openness, neuroticism, helpfulness, stimulation, tradition, pleasure, achievement, harmony, love, practicality, liberty, and closeness for each of the plurality of authors; and determining a percentile of each score of each metric for each of the plurality of authors relative to a population having a respective distribution of scores for each of the plurality of metrics;

clustering a set of authors into a first cluster based on the personality profiles of the plurality of authors, wherein the first cluster is defined by a respective range of scores for each of the plurality of metrics;

compiling, in response to the clustering, a first set of textual data created by authors of the set of authors in the first cluster;

computing a plurality of sentiment scores of a plurality of portions of text from the first set of textual data;

normalizing the plurality of sentiment scores, wherein normalizing the plurality of sentiment scores further comprises:

computing a sum of sentiment scores for the first cluster by adding the plurality of sentiment scores generated for the first cluster;

computing an average sentiment score by dividing the sum of sentiment scores for the first cluster by a total number of sentiment scores generated for the first cluster; and computing a plurality of normalized sentiment scores by dividing each of the plurality of sentiment scores for the first cluster by the average sentiment score of the first cluster; and storing the plurality of normalized sentiment scores for the first cluster and the respective range of scores for each of the plurality of metrics defined by the first cluster in the computer readable storage medium.

16. The computer program product of claim 15, the method further comprising:

receiving a request to perform sentiment analysis on a new set of text;

characterizing a personality profile of an author of the new set of text based on scores of the plurality of metrics;

determining the scores of the plurality of metrics are within the respective range of scores defined by the first cluster;

retrieving, from the computer readable storage medium, the plurality of normalized sentiment scores for the first cluster; and computing a sentiment for a portion of the new set of text according to the plurality of normalized sentiment scores.

17. The computer program product of claim 16, wherein computing the sentiment of the portion of the new set of text further comprises:

matching portions of the new set of text with portions of the first set of textual data;

applying a subset of the plurality of normalized sentiment scores to matched portions of the new set of text; and combining the subset of the plurality of normalized sentiment scores for the matched portions of the new set of text.

18. The computer program product of claim 15, wherein clustering the set of authors into the first cluster further comprises:

determining, for a first author, that the scores for each of the plurality of metrics of a personality profile of the first author is within the respective range of scores for each of the plurality of metrics defined by the first cluster; and assigning the first author to the first cluster.

19. The computer program product of claim 15, the method further comprising:

clustering the plurality of authors into a plurality of clusters, wherein each of the plurality of clusters is associated with respective percentile ranges corresponding to each of agreeableness, extraversion, conscientiousness, openness, neuroticism, helpfulness, stimulation, tradition, pleasure, achievement, harmony, love, practicality, liberty, and closeness.

20. The computer program product of claim 19, wherein each author in the set of authors is associated with a percentile in each of agreeableness, extraversion, conscientiousness, openness, neuroticism, helpfulness, stimulation, tradition, pleasure, achievement, harmony, love, practicality, liberty, and closeness that falls within a range of percentiles of each of agreeableness, extraversion, conscientiousness, openness, neuroticism, helpfulness, stimulation, tradition, pleasure, achievement, harmony, love, practicality, liberty, and closeness defined by the first cluster.

* * * * *